(12) United States Patent
Kfir et al.

(10) Patent No.: US 7,305,013 B2
(45) Date of Patent: Dec. 4, 2007

(54) HANDLING TRAFFIC IN A SYNCHRONOUS COMMUNICATION NETWORK

(75) Inventors: Asher Kfir, Givat Shmuel (IL); Eitan Yehuda, Zoran (IL)

(73) Assignee: ECI Telecom Ltd., Petach Tikva (IL)

( * ) Notice: Subject to any disclaimer, the term of this patent is extended or adjusted under 35 U.S.C. 154(b) by 1051 days.

(21) Appl. No.: 10/358,267

(22) Filed: Feb. 5, 2003

(65) Prior Publication Data

US 2003/0202540 A1 Oct. 30, 2003

(30) Foreign Application Priority Data

Apr. 24, 2002 (IL) .................................. 149323

(51) Int. Cl.
*H04J 3/06* (2006.01)
(52) U.S. Cl. ..................... 370/516; 370/535; 370/907
(58) Field of Classification Search ................ 370/516, 370/517, 535, 538, 541, 543, 544, 907
See application file for complete search history.

(56) References Cited

U.S. PATENT DOCUMENTS

| | | | |
|---|---|---|---|
| 5,465,252 A | 11/1995 | Müller | |
| 5,717,693 A | 2/1998 | Baydar | |
| 5,917,824 A | 6/1999 | Brueckheimer et al. | |
| 6,834,058 B1 * | 12/2004 | Moyal et al. ................ | 370/503 |
| 6,917,630 B1 * | 7/2005 | Russell et al. ............... | 370/532 |
| 7,031,351 B2 * | 4/2006 | Jeon ............................ | 370/539 |
| 7,085,293 B2 * | 8/2006 | Raghavan et al. .......... | 370/506 |
| 7,103,278 B2 * | 9/2006 | Traverso ..................... | 398/79 |
| 2002/0037013 A1 | 3/2002 | Grammel | |
| 2002/0037019 A1 | 3/2002 | Heuer | |
| 2002/0126712 A1 | 9/2002 | Mueller | |
| 2003/0202540 A1 | 10/2003 | Kfir et al. | |

FOREIGN PATENT DOCUMENTS

| | | |
|---|---|---|
| DE | 4104238 A1 | 8/1992 |
| DE | 69504337 T2 | 1/1999 |
| DE | 19858149 A1 | 6/2000 |
| DE | 10056220 A1 | 5/2002 |
| EP | 1011220 A2 | 6/2000 |
| EP | 1357688 | 10/2003 |
| JP | 5-63663 | 3/1993 |
| JP | 6-326538 | 11/1994 |
| JP | 7-74679 | 3/1995 |
| JP | 7-321690 | 12/1995 |

(Continued)

OTHER PUBLICATIONS

T1X1.5/2000-157R1 dated Jul. 10-14, 2000 "A Justification for a Variable Bandwidth Allocation Methodology for SONET Virtually Concatenated SPEs" N. Jones and T. Wilson.

(Continued)

*Primary Examiner*—Chau Nguyen
*Assistant Examiner*—Marcus R Smith
(74) *Attorney, Agent, or Firm*—Browdy and Neimark, PLLC

(57) ABSTRACT

A method for enabling communication between synchronous network elements, which is adapted to support dynamic application of various types of changes, such as adding a new channel, to an aligned group of virtually concatenated channels carrying communication traffic between these elements.

15 Claims, 4 Drawing Sheets

FOREIGN PATENT DOCUMENTS

WO   WO 99/56421 A1   11/1999
WO   WO 00/46937      8/2000

OTHER PUBLICATIONS

T1X1.5/99-098 dated Apr. 9, 1999 "Higher Order SONET Virtual Concatenation" N. Jones, et al.

T1X1.5/2000-199 Dated Oct. 9-13, 2000; "A Proposed Link Capacity Adjustment Scheme (LCAS) for SONET Virtually Concatenated SPEs" N. Jones et al.

The Communications Handbook, CRC Press & IEEE Press, 1997, Editor-in-Chief Jerry D. Gibson: Chapters 39 and 40, pp. 542-564.

Choy, Larry. *Virtual Concatenation Tutorial: Enhancing SONET/SDH Networks for Data Transport, Journal of Optical Networking*, vol. 1, No. 1 (Jan. 2002), pp. 18-29.

Damle, et al. *Need for Concatenating Optical Channels to Create a Transparent High Bandwidth Channels, Contribution for T1 Standards Project*, (Mar. 26, 2001). Retrieved from the Internet: <URL: ftp.t1.org/Pub/T1X1/2001X15/0x150900.doc>. [Retrieved on Mar. 26, 2001].

Link Capacity Adjustment Scheme (LCAS) for Virtual Concatenated Signals; *ITU-T G.7042/Y.1305, XX, XX*, Nov. 2001, pp. 1-25, XP002216519.

\* cited by examiner

US 7,305,013 B2

HANDLING TRAFFIC IN A SYNCHRONOUS COMMUNICATION NETWORK

FIELD OF THE INVENTION

The present invention relates generally to synchronous communication networks and more particularly to virtual concatenation in synchronous communication networks.

BACKGROUND OF THE INVENTION

Virtual concatenation is used today in synchronous communication networks, such as Synchronous Optical Network (SONET) based networks or Synchronous Digital Hierarchy (SDH) based networks, to combine multiple synchronous channels carrying low rate payload into a single synchronous channel carrying high rate payload. A mechanism to enable dynamic virtual concatenation for increasing or decreasing capacity of a link without service affecting is developed today under the Link Capacity Adjustment Scheme (LCAS).

However, there are still several problems that are not addressed by LCAS, such as dynamically adding channels to and removing channels from a group of virtually concatenated channels where network delays associated with the channels to be added and removed are different from network delays associated with the group. Solutions to such problems are therefore considered as highly desired.

Some aspects of technologies and related art that may be useful in understanding the present invention are described in the following publications:

a contribution T1X1.5/2000-157R1 dated Jul. 10-14, 2000 of Lucent Technologies to the T1 Standards Project—T1X1.5 which proposes a justification for a variable bandwidth allocation (VBA) methodology for SONET virtually concatenated SPEs (SPE—Synchronous Payload Envelope);

a contribution T1X1.5/1999-098 dated Apr. 9, 1999 of Lucent Technologies to the T1 Standards Project—T1X1.5 which describes higher order SONET virtual concatenation;

a contribution T1X1.5/2000-199 dated Oct. 9-13, 2000 of Lucent Technologies to the T1 Standards Project—T1X1.5 which describes a proposed link capacity adjustment scheme (LCAS) for SONET virtually concatenated SPEs; and the following chapters in *The Communications Handbook*, CRC Press & IEEE Press, 1997, Editor-in-Chief Jerry D. Gibson: Chapter 39 on pages 542-553, and Chapter 40 on pages 554-564.

The disclosures of all references mentioned above and throughout the present specification are hereby incorporated herein by reference.

SUMMARY OF THE INVENTION

The present invention seeks to provide methods and apparatus that enable dynamic virtual concatenation of channels in a synchronous network or a network using synchronous transmission such as an Ethernet-over-synchronous network without affecting traffic in cases where the channels are associated with different network delays.

Further objects and features of the invention will become apparent to those skilled in the art from the following description and the accompanying drawings.

There is thus provided in accordance with a preferred embodiment of the present invention a method for dynamically adding a new channel to a group of virtually concatenated channels carrying traffic to a network element (NE) of a synchronous network, the method comprising the steps of:

if a network delay associated with said new channel is longer than a network delay associated with said group of virtually concatenated channels:

delaying traffic received along the group of virtually concatenated channels until the group of virtually concatenated channels and the new channel are time-aligned, and adding said new channel to the group of virtually concatenated channels following said time-alignment of the group of virtually concatenated channels and the new channel; and if the network delay associated with the new channel is shorter than the network delay associated with said group of virtually concatenated channels:

delaying traffic in the new channel until the new channel and the group of virtually concatenated channels are time-aligned, and adding said new channel to the group following said time-alignment of the new channel and the group of virtually concatenated channels.

According to a preferred embodiment of the invention, any of the delaying steps comprises a step of applying at least one positive pointer justification action.

In accordance with an embodiment of the present invention, if the network delay associated with the new channel is shorter by a period TD2 than the network delay associated with the group of virtually concatenated channels, the step of delaying traffic in the new channel comprises one of the following:

a step of applying at least one direct delay action on the new channel for a period TD2; and a step of delaying traffic in the new channel for NC2 consecutive positive pointer justification actions, each having a duration $TL2_j$, where j is an index running from 1 to NC2, and $$TD2 = \sum_{j=1}^{NC2} TL2_j.$$

Preferably, the step of applying at least one positive pointer justification action comprises applying a plurality of consecutive positive pointer justification actions until the new channel and the group of virtually concatenated channels are time-aligned.

By another embodiment of the invention, if the network delay associated with the new channel is longer by a period TD1 than the network delay associated with the group of virtually concatenated channels, the step of delaying the traffic received along the group of virtually concatenated channels comprises a step of applying on the traffic received along the group of virtually concatenated channels NC1 consecutive positive pointer justification actions, each having a duration $TL1_i$, where i is an index running from 1 to NC1, and $$TD1 = \sum_{i=1}^{NC1} TL1_i.$$

Examples of such synchronous network could be found in networks based on the Synchronous Optical Network (SONET) and networks based on the Synchronous Digital Hierarchy (SDH), wherein the new channel and the channels in the group comprises a virtual container (VC), which typically could be a higher order VC or a lower order VC.

According to another embodiment of the present invention there is provided a method for dynamically removing a selected channel from a group of virtually concatenated channels carrying traffic to a network element (NE) of a synchronous network, the method comprising the steps of:

removing the selected channel from the group of virtually concatenated channels; and if the network delay associated with the group of virtually concatenated channels following the removal of the selected channel is shorter than a network delay associated with the removed channel, applying at least one negative pointer justification action on the group of virtually concatenated channels excluding the removed channel. Preferably, the step of applying at least one negative pointer justification action comprises applying a plurality of consecutive negative pointer justification actions until the network delay associated with the group of virtually concatenated channels excluding said removed channel is minimized.

Still preferably, if the network delay associated with the removed channel is longer than the network delay associated with the group of virtually concatenated channels excluding said removed channel by a period TD, the step of applying at least one negative pointer justification action comprises applying at most NC consecutive negative pointer justification actions on the group of virtually concatenated channels excluding the removed channel, where each of said NC consecutive negative pointer justification action has a duration $TL_i$, i is an index running from 1 to NC, and $$TD = \sum_{i=1}^{NC} TL_i.$$

According to still another embodiment of the invention, there is provided a method for dynamically removing a selected channel from a group of virtually concatenated channels carrying traffic to a network-element NE) of a synchronous network, the method comprising the steps of:

removing the selected channel from said group of virtually concatenated channels; and if a buffer delay associated with each channel in the group following the removal of the selected channel is longer than a minimum delay, applying at least one negative pointer justification action on the group of virtually concatenated channels excluding that removed channel.

Preferably, the step of applying at least one negative pointer justification action comprises applying a plurality of consecutive negative pointer justification actions until the buffer delay associated with each channel in the group excluding the removed channel is minimized.

By another embodiment, the step of applying at least one negative pointer justification action comprises applying a plurality of consecutive negative pointer justification actions until the buffer delay associated with each channel in the group excluding the removed channel is zero.

According to another aspect of the invention there is provided apparatus for dynamically adding a new channel to a group of virtually concatenated channels carrying traffic, the apparatus comprising:

a controller; and a synchronous processor operatively associated with the group of virtually concatenated channels and the new channel, and operative, under control of the controller, to perform the following:

delay traffic received along the group of virtually concatenated channels until time-aligning this group and the new channel and add the new channel to the group following the time-alignment of the group and the new channel if a network delay associated with the new channel is longer than a network delay associated with the group, and delay traffic in the new channel until time-aligning the new channel and the group and add the new channel to the group following the time-alignment of the new channel and the group if the network delay associated with the new channel is shorter than the network delay associated with the group.

Preferably, the synchronous processor is operative to delay the traffic received along the group of virtually concatenated channels by applying, under control of the controller, at least one positive pointer justification action.

By yet another preferred embodiment, the synchronous processor is operative to delay the traffic in the new channel by applying, under control of the controller, one of the following:

a direct delay action; and at least one positive pointer justification action.

In accordance with still another preferred embodiment, the synchronous processor is operative to delay the traffic received along the group of virtually concatenated channels or the traffic in the new channel by applying, under control of the controller, a plurality of consecutive positive pointer justification actions until time-alignment of the group of virtually concatenated channels and the new channel.

Preferably, if the network delay associated with the new channel is shorter by a period TD2 than the network delay associated with the group of virtually concatenated channels, the synchronous processor is operative to delay the traffic in the new channel by applying, under control of the controller, one of the following:

at least one direct delay action on said new channel for a period TD2; and

NC2 consecutive positive pointer justification actions, each having a duration $TL2_j$, where j is an index running from 1 to NC2, and $$TD2 = \sum_{j=1}^{NC2} TL2_j.$$

According to another preferred embodiment, if the network delay associated with the new channel is longer by a period TD1 than the network delay associated with the group of virtually concatenated channels, the synchronous processor is operative to delay the traffic received along the group of virtually concatenated channels by applying on the traffic received along the group of virtually concatenated channels NC1 consecutive positive pointer justification actions, each having a duration $TL1_i$, where i is an index running from 1 to NC1, and $$TD1 = \sum_{i=1}^{NCI} TL1_i.$$

In accordance with another embodiment of the invention there is provided an apparatus for dynamically removing a selected channel from a group of virtually concatenated channels carrying traffic to the network element ("NE"), the apparatus comprising:

a controller; and a synchronous processor operative to remove the selected channel from the group, and to apply after removal of the selected channel under control of the controller, at least one negative pointer justification action on the group excluding the removed channel if a network delay associated with the group after the removal of the selected channel is shorter than a network delay associated with the removed channel.

Preferably, the synchronous processor is operative to apply the at least one negative pointer justification action through a process of applying a plurality of consecutive negative pointer justification actions until the network delay associated with the group of virtually concatenated channels excluding the removed channel is minimized.

Still preferably, if the network delay associated with the removed channel is longer by a period TD than the network delay associated with the group of virtually concatenated channels excluding the removed channel, the synchronous processor is operative to apply the at least one negative pointer justification action by applying at most NC consecutive negative pointer justification actions on the group excluding said removed channel, where each of the NC consecutive negative pointer justification action has a duration $TL_i$, i is an index running from 1 to NC, and $$TD = \sum_{i=1}^{NC} TL_i.$$

In accordance with another embodiment, there is provided an apparatus operative in a synchronous network for dynamically removing a selected channel from a group of virtually concatenated channels carrying traffic to the NE, the apparatus comprising:

a controller; and a synchronous processor comprising a buffer, the synchronous processor being operative to remove the selected channel from the group of virtually concatenated channels, and after removal of the selected channel to apply under control of the controller at least one negative pointer justification action on the group of virtually concatenated channels excluding the removed channel if a buffer delay associated with each channel in the group excluding the removed channel is longer than a minimum delay.

Preferably, the synchronous processor is operative to apply the at least one negative pointer justification action through a process of applying a plurality of consecutive negative pointer justification actions until the buffer delay associated with each channel in the group excluding the removed channel is minimized.

Still preferably, the synchronous processor is operative to apply the at least one negative pointer justification action through a process of applying a plurality of consecutive negative pointer justification actions until the buffer delay associated with each channel in the group excluding the removed channel is zero.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
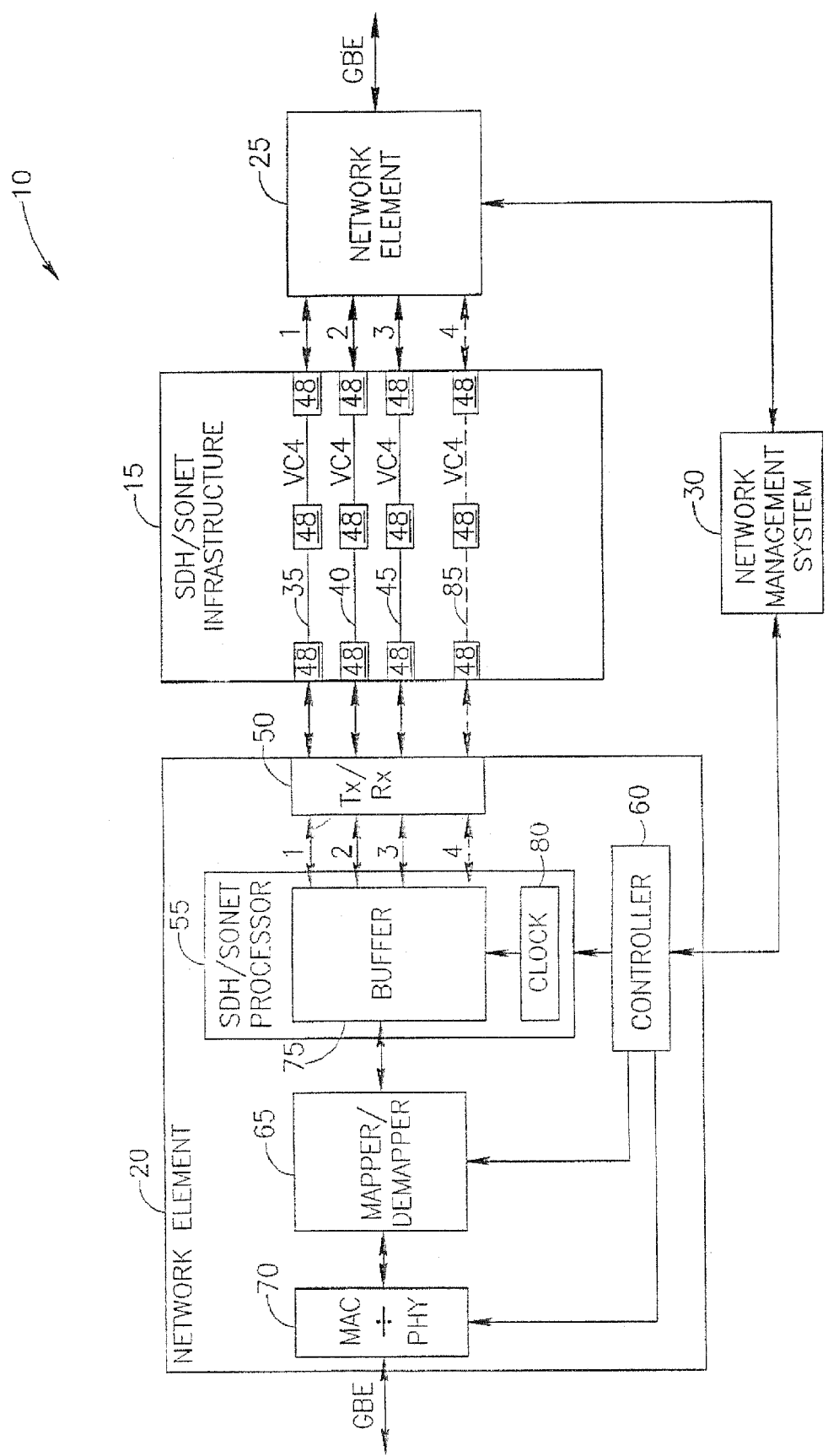
FIG. 1 is a simplified block diagram illustration of a preferred implementation of a synchronous communication network constructed and operative in accordance with a preferred embodiment of the present invention.

Reference is now made to FIG. 1 which is a simplified block diagram illustration of a preferred implementation of a synchronous communication network 10 constructed and operative in accordance with a preferred embodiment of the present invention.

The synchronous communication network 10 may preferably include at least one of the following: a network based on the Synchronous Optical Network (SONET); and a network based on the Synchronous Digital Hierarchy (SDH).

Preferably, the network 10 includes a plurality of network elements (NEs) that communicate with each other via synchronous infrastructure 15. The plurality of NEs may include, for example, routers/switches that communicate with each other via the synchronous infrastructure 15 in a synchronous format, and with network terminals in a synchronous format or another format, such as an Ethernet format.

By way of example, only two NEs, indicated by reference numerals 20 and 25, are depicted in FIG. 1. The NE 20 and the NE 25 preferably enable communication between network terminals associated therewith (not shown) over the synchronous infrastructure 15 under control of a network management system 30 that is preferably operatively associated with the NE 20, the NE 25 and the synchronous infrastructure 15. Alternatively, the NE 20 and the NE 25 may be separately managed by separate management systems (not shown). It is appreciated that the present invention is not limited by the number of NEs communicating via the synchronous infrastructure 15.

Further by way of example, and without limiting the generality of the description, the network 10 in FIG. 1 is arranged as an Ethernet-over-synchronous network in which the NEs 20 and 25 communicate with the network terminals associated therewith in an Ethernet format, such as a Gigabit Ethernet (GBE) format.

It is however appreciated that the present invention is not limited by a communication format used in communication between each NE and its associated network terminal.

Preferably, the NE 20 and the NE 25 may employ virtual concatenation in communication over the synchronous infrastructure 15. In such a case, communication between the NE 20 and the NE 25 may be carried out over a plurality of individual channels, each passing via the synchronous infrastructure 15, and the number of individual channels over which the communication between the NE 20 and the NE 25 is carried out may change from time to time. Each of the plurality of individual channels may preferably be represented by one virtual container (VC). The VC may be either a higher order (HO) VC or a lower order (LO) VC. The higher order VC may include a VC-4 or a VC-3. The lower order VC may include one of the following: a VC-11; a VC-12; and a VC-2. It is appreciated that many channels may use the same route.

Preferably, the number of individual channels over which communication between the NE 20 and the NE 25 is carried out may vary dynamically without service affecting to comply with LCAS. By way of example, FIG. 1 depicts a group of three virtually concatenated channels, indicated by reference numerals 35, 40 and 45, over which communication between the NE 20 and the NE 25 is carried out during an arbitrary time period. Further by way of example, and without limiting the generality of the description, the channels 35, 40 and 45 are VC4 channels. It is however appreciated that the present invention is not limited by the number of virtually concatenated channels over which communication between the NE 20 and the NE 25 is carried out, or, in a case where the channels are VC channels, a VC type of the VC channels.

The channels 35, 40 and 45 may have different trail lengths due to different lengths of routes used thereby and different communication equipment passed thereby. The different trail lengths typically cause different network delays. The communication equipment passed by the channels 35, 40 and 45 is typically comprised in nodes 48 within the synchronous infrastructure 15 that are passed by the channels 35, 40 and 45. It is appreciated that each of the channels 35, 40 and 45 may be composed of one or more path segments, each spanning between two nodes 48 within the synchronous infrastructure 15, and the number of nodes 48 passed by each of the channels 35, 40 and 45 may vary. Each node 48 typically includes a network element with at least conventional synchronous network functionality.

The term "network delay" is used throughout the specification and claims to refer to a delay imposed on a signal due to its passage in a network. Signals are typically carried over channels, and the channels may have different lengths of routes spanning along different physical distances and passing via different communication equipment. Therefore, different network delays may be associated with different channels, and, for example, a signal carried over a channel may experience a network delay that is different from a network delay experienced by an identical signal carried over another channel.

The channels 35, 40 and 45 eventually terminate at the NE 20 and the NE 25. The NE 20 and the NE 25 are preferably similar in structure and functionality. For simplicity of depiction and description, and without limiting the generality of the description, only the NE 20 is shown in FIG. 1 with details to the extent by which the present invention may be appreciated.

The NE 20 preferably includes the following units: a transceiver section 50; a synchronous processor 55; a controller 60; a mapper/demapper 65; and an interface section 70. It is appreciated that the synchronous processor 55 and the mapper/demapper 65 may be embodied in a single integrated circuit (IC) (not shown).

The interface section 70 in FIG. 1 includes both a media access control (MAC) interface and a physical layer (PHY) interface that enable communication in GBE format with the network terminal associated with the NE 20. It is however appreciated that in a case where the NE 20 communicates with its associated network terminal in a format other than GBE, the interface section 70 may alternatively include interface elements other than the MAC interface and the PHY interface, such interface elements being suitable for communication with the network terminal associated with the NE 20 in the format other than the GBE format.

The transceiver section 50 preferably includes an optical transmitter section and an optical receiver section (both not shown) that may be embodied in separate units or in a combined unit. The optical transmitter section preferably includes an optical transmitter or a plurality of optical transmitters and the optical receiver section preferably includes an optical receiver or a plurality of optical receivers. The transceiver section 50 typically communicates optical signals representing data with similar transceiver sections (not shown) in nodes 48 in the synchronous infrastructure 15.

Preferably, the optical receiver section in the transceiver section 50 receives from the nodes 48 in the synchronous infrastructure 15 optical signals via a plurality of channels including, for example, the VC4 channels 35, 40 and 45. The optical receiver section then provides an electronic representation of the VC4 channels 35, 40 and 45 to the synchronous processor 55 for processing thereby.

The optical transmitter section in the transceiver section 50 preferably receives from the synchronous processor 55 electronic signals representing data carried in a plurality of channels, such as a plurality of VC4 channels. Preferably, the optical transmitter section in the transceiver section 50 converts the electronic signals received thereat from the synchronous processor 55 into optical signals, and transmits the optical signals to the transceiver sections in the nodes 48 in the synchronous infrastructure 15.

The synchronous processor 55 may preferably include a SONET processor or an SDH processor depending respectively on a type of synchronous transmission technology employed in the network 10. Preferably, the synchronous processor 55 includes at least one buffer 75 that receives and arranges electronic signals for processing by the synchronous processor 55 and/or for transmitting either to the network terminal associated with the NE 20 or to the transceiver sections in the nodes 48 in the synchronous infrastructure 15. The at least one buffer 75 is clocked by a clock 80, and both the clock 80 and the at least one buffer 75, as well as the synchronous processor 55, may preferably be controlled by the controller 60, for example, according to management information received from the network management system 30.

In communication in a direction from the NE 20 to the network terminal associated with the NE 20, the synchronous processor 55 processes electronic signals representing optical signals received at the optical receiver section in the transceiver section 50 thereby generating processed data in a synchronous format. The synchronous processor 55 then outputs the processed data to the mapper/demapper 65. The mapper/demapper 65 preferably performs demapping operations on the processed data received from the synchronous processor 55 to demap the data into data in a GBE format and provides demapped data in a GBE format to the interface section 70 which outputs the demapped data to the network terminal associated with the NE 20.

In communication in a direction from the network terminal associated with the NE 20 to the NE 20, the interface section 70 preferably receives data in a GBE format from the network terminal, and provides the data to the mapper/ demapper 65. The mapper/demapper 65 preferably maps the data in a GBE format into data in a synchronous format that is carried along a plurality of channels. The mapper/demapper 65 then preferably provides the data in a synchronous format that is carried along the plurality of channels to the synchronous processor 55. In the synchronous processor 55, the data carried along the plurality of channels is preferably processed and arranged, for example in VC4 channels, for transmission by the optical transmitter section in the transceiver section 50.

The synchronous processor 55 together with the controller 60 preferably form apparatus in the NE 20 that is particularly suitable for dynamically adding, without service affecting, a new channel to a group of virtually concatenated channels carrying traffic in cases where a network delay associated with the new channel is different from a network delay associated with the group of virtually concatenated channels.

The term "network delay associated with a group of virtually concatenated channels" is used throughout the specification and claims to refer to a sum of a network delay experienced by a channel in the group and a buffer delay experienced by the channel. The term "buffer delay" is used throughout the specification and claims to refer to a delay experienced by a channel due to a channel alignment process that aligns the channel with other channels by performing buffering operations in a buffer, wherein the buffer delay is typically represented by a position in the buffer relative to a first clocked cell of the buffer.

It is appreciated that a network delay associated with a channel that does not form part of the group, such as a channel before it is added by virtual concatenation to the group may be different from the network delay associated with the group. However, once the channel, forms part of the group, the channel acquires the network delay of the group.

Preferably, the new channel is prepared for addition to the group and if the network delay associated with the new channel is longer than the network delay associated with the group, the synchronous processor 55 may preferably delay the traffic received along the group of virtually concatenated channels until time-alignment of the group of virtually concatenated channels and the new channel. Following the time-alignment of the group of virtually concatenated channels and the new channel, the synchronous processor 55 may preferably add the new channel to the group of virtually concatenated channels and activate the new channel for carrying traffic.

If the network delay associated with the new channel is shorter than the network delay associated with the group, the synchronous processor 55 may preferably delay traffic in the new channel until time-alignment of the new channel and the group of virtually concatenated channels. Following the time-alignment of the new channel and the group, the synchronous processor 55 may preferably add the new channel to the group of virtually concatenated channels and activate the new channel for carrying traffic.

Preferably, the synchronous processor 55 is operative to delay the traffic received along the group of virtually concatenated channels by applying, under control of the controller 60, at least one positive pointer justification action as is well known in the art. When delaying of the traffic received along the group of virtually concatenated channels involves more than one positive pointer justification action, the synchronous processor 55 may apply, under control of the controller, a plurality of consecutive positive pointer justification actions until time-alignment of the group of virtually concatenated channels and the new channel. Thus, if the network delay associated with the new channel is longer by a period TD1 than the network delay associated with the group of virtually concatenated channels, the synchronous processor 55 may preferably apply on the traffic received along the group of virtually concatenated channels NC1 consecutive positive pointer justification actions, each having a duration $TL1_i$, where i is an index running from 1 to NC1, and $$TD1 = \sum_{i=1}^{NC1} TL1_i.$$

In a case where delaying of traffic in the new channel is required, the synchronous processor 55 may preferably delay traffic in the new channel by applying, under control of the controller 60, one of the following: a direct delay action; and at least one positive pointer justification action.

The term "direct delay action" as applied to a channel is used throughout the specification and claims to refer to an action that is employed to delay traffic in the channel for a selected time period. It is appreciated that the direct delay action may be used with the new channel because the new channel does not carry traffic before it is added to the group and therefore application of the direct delay action is not traffic affecting. If the network delay associated with the new channel is shorter by a period TD2 than the network delay associated with the group of virtually concatenated channels, delaying of traffic in the new channel may be obtained by applying the direct delay action on the new channel for a period TD2.

In a case where delaying of traffic in the new channel is obtained by applying at least one positive pointer justification action, application of the at least one positive pointer justification action may include, for example, application of a plurality of consecutive positive pointer justification actions until time-alignment of the new channel and the group of virtually concatenated channels. Thus, for the network delay associated with the new channel that is shorter by the period TD2 than the network delay associated with the group of virtually concatenated channels, delaying of traffic in the new channel may be obtained by performing NC2 consecutive positive pointer justification actions, each having a duration $TL2_j$, where j is an index running from 1 to NC2, and $$TD2 = \sum_{j=1}^{NC2} TL2_j.$$

By way of example, in FIG. 1 the group of virtually concatenated channels includes the three VC4 channels 35, 40 and 45, and the new channel that is to be added to the group of virtually concatenated channels is a VC4 channel indicated by reference numeral 85. Further by way of example, the channel 85 in FIG. 1 has a network delay that is longer than a network delay of the group of virtually concatenated channels 35, 40 and 45.

The apparatus formed by the synchronous processor 55 together with the controller 60 may also preferably be employed for dynamically removing, without service affecting, a selected channel from a group of virtually concatenated channels carrying traffic. In such a case, the synchronous processor 55 preferably removes the selected channel from the group of virtually concatenated channels, and if a network delay associated with the group of virtually concatenated channels excluding the removed channel is shorter than a network delay associated with the removed channel, the synchronous processor 55 may preferably apply under control of the controller 60 after removal of the selected channel at least one negative pointer justification action on the group of virtually concatenated channels excluding the removed channel.

It is appreciated that the network delay associated with the group of virtually concatenated channels excluding the removed channel and the network delay associated with the removed channel are not necessarily calculated in order to determine which of the delays is shorter. Rather, a relation between the network delay associated with the group excluding the removed channel and the network delay associated with the removed channel may be obtained by relating a buffer delay associated with each channel in the group excluding the removed channel to a minimum necessitated delay. The minimum necessitated delay is typically, but not necessarily, a delay represented by a delay obtained when the at least one buffer 75 is empty. The at least one negative pointer justification action is then applied by the synchronous processor 55 on the group excluding the removed channel after removal of the selected channel if the buffer delay of each channel in the group excluding the removed channel is longer than the minimum necessitated delay.

It is appreciated that application of the at least one negative pointer justification action is intended to reduce or cancel a delay of the group of virtually concatenated channels resulting from the network delay of the removed channel before removal from the group being the longest in the group. The reason for using pointer justification actions to reduce or cancel such a delay of the group is to prevent service affecting.

Application of the at least one negative pointer justification action may include, for example, a process of applying a plurality of consecutive negative pointer justification actions until the network delay associated with the group of virtually concatenated channels excluding the removed channel is minimized or until the buffer delay associated with each channel in the group excluding the removed channel is minimized. A trigger for ending the process of applying a plurality of consecutive negative pointer justification actions may be, for example, emptying of the at least one buffer 75 in which case the buffer delay is zero. Thus, if the network delay associated with the removed channel is longer by a period TD than the network delay associated with the group of virtually concatenated channels excluding the removed channel, the synchronous processor 55 may apply at most NC consecutive negative pointer justification actions on the group of virtually concatenated channels excluding the removed channel, where each of the NC consecutive negative pointer justification actions has a duration $TL_i$, i is an index running from 1 to NC, and $$TD = \sum_{i=1}^{NC} TL_i.$$

According to another preferred embodiment of the invention, the addition of a channel to a group of virtually concatenated channels (or the removal of channel therefrom, mutates mutandis) is carried out in the following way: NE 20 transmits request to stop transmission of traffic along the active group of concatenated channels (e.g. a PAUSE instruction in the case of Gbe) to the MAC associated therewith. In response to this instruction, no traffic will be transmitted from the MAC to NE 20. Following this step, NE 20 transmits a message indicating the addition of the new channel to the group (e.g. a "data active" message). Thereafter, traffic is withheld for a required period of time, which can be substantially equal to the delay between the group delay and the delay of the added channel, or alternatively, such period could be substantially equal to the maximum delay allowed in that network. After this required period has lapsed, the PAUSE is released, and traffic along the group of concatenated channels, including the added channel, is resumed.

In accordance with another embodiment of the invention, NE 20 is provided with a buffer which size is substantially twice the maximum delay allowed in the network. When a new channel should be added to a group of virtually concatenated channels (or a channel should be removed therefrom, mutates mutandis), a first of the traffic carrying channels arriving at NE 20 is stored at the middle (timewise) of the buffer, and every proceeding channel that belong to the group (the "old" channels as well as the channel to be added) is stored and aligned with that first traffic carrying channel. Once all the channels belonging to the group of concatenated channels (including the newly added channel) are time aligned, traffic may be transmitted along the newly added channel of this group.

Figure 2:
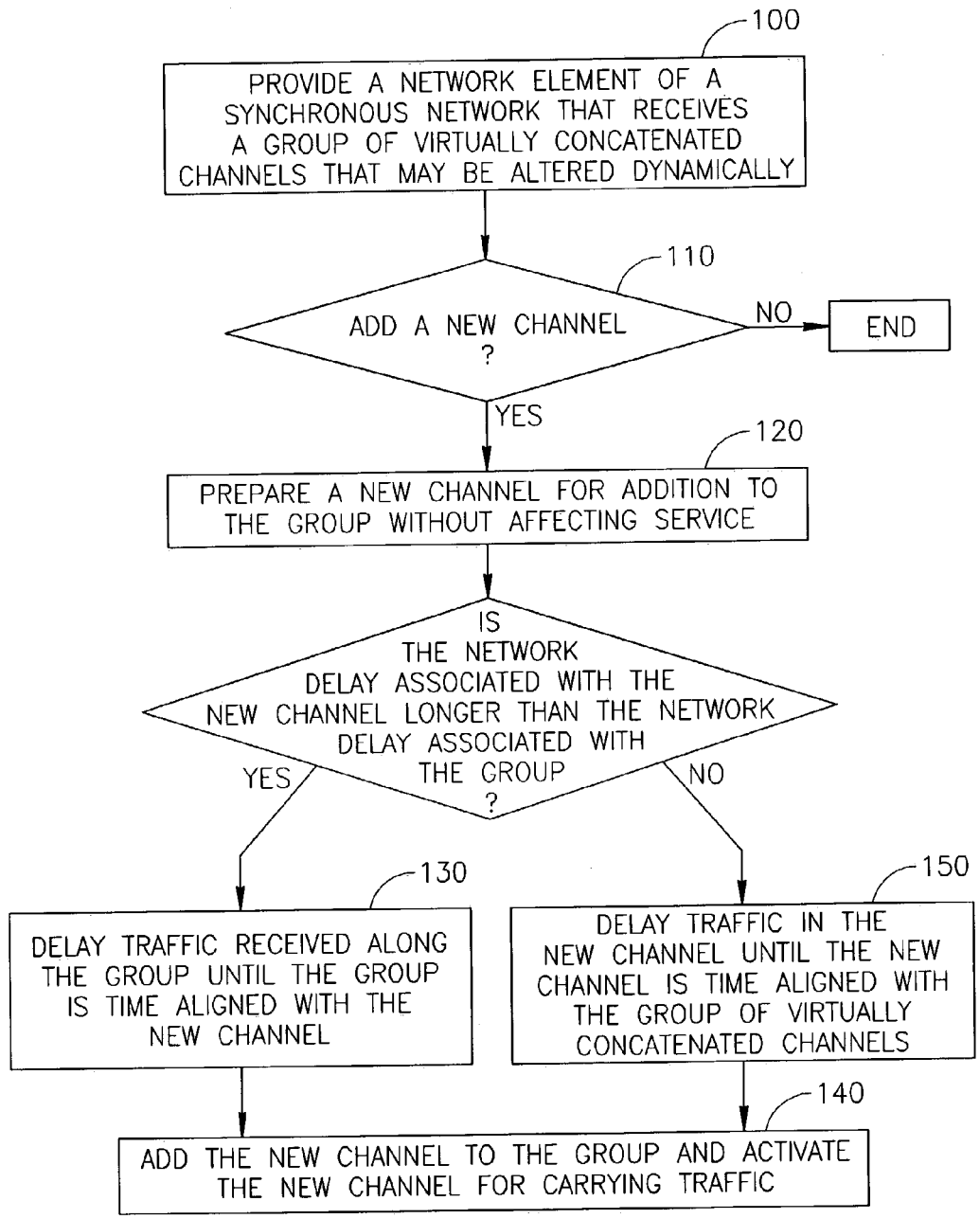
FIG. 2 is a simplified flowchart illustration of a preferred method of operation of the network of FIG. 1.

Reference is now made to FIG. 2 which is a simplified flowchart illustration of a preferred method of operation of the network 10 of FIG. 1.

A network element of a synchronous network that is operatively associated with a group of virtually concatenated channels that may dynamically be altered is preferably provided (step 100). Communication with the NE is monitored to determine whether adding a new channel to the group is required (step 110).

In a case where addition of a new channel to the group is required, the new channel is preferably prepared for addition to the group without service affecting (step 120). Then, if a network delay associated with the new channel is longer than a network delay associated with the group of virtually concatenated channels, traffic received along the group of virtually concatenated channels is preferably delayed (step 130) until time-alignment of the group of virtually concatenated channels and the new channel. Following the time-alignment of the group of virtually concatenated channels and the new channel, the new channel is preferably added (step 140) to the group of virtually concatenated channels and activated for carrying traffic.

If the network delay associated with the new channel is shorter than the network delay associated with the group of virtually concatenated channels, traffic in the new channel is preferably delayed (step 150) until time-alignment of the new channel and the group of virtually concatenated channels. Following the time-alignment of the new channel and the group of virtually concatenated channels, the new channel is preferably added (step 140) to the group of virtually concatenated channels and activated for carrying traffic.

It is appreciated that delaying of the traffic received along the group of virtually concatenated channels or delaying of the traffic in the new channel may be obtained by applying at least one positive pointer justification action. In a case where traffic in the new channel is delayed, delaying of the traffic in the new channel may alternatively be obtained by applying at least one direct delay action on the new channel.

Figure 3:
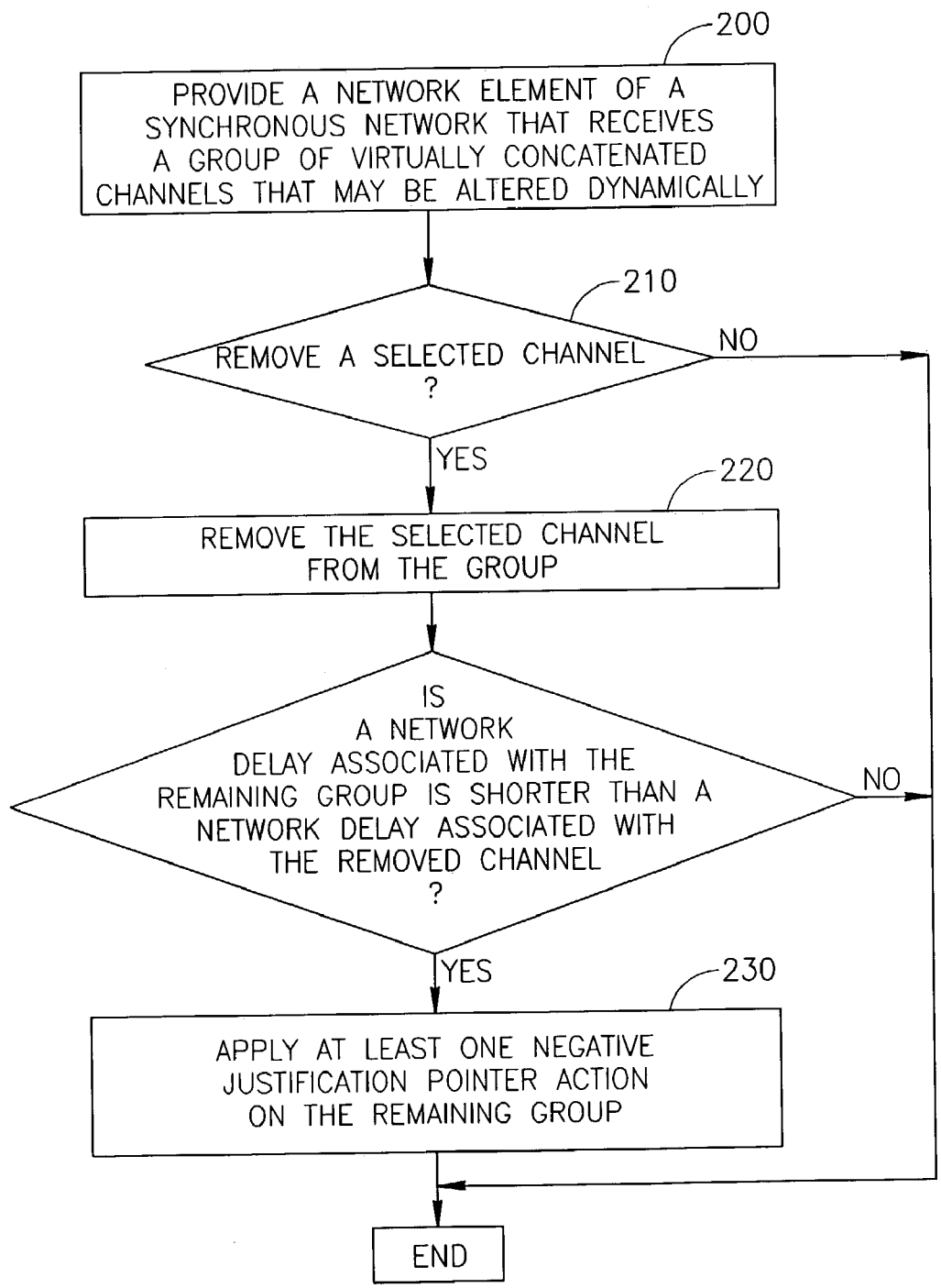
FIG. 3 is a simplified flowchart illustration of another preferred method of operation of the network of FIG. 1.

Reference is now made to FIG. 3 which is a simplified flowchart illustration of another preferred method of operation of the network 10 of FIG. 1.

A network element of a synchronous network that is operatively associated with a group of virtually concatenated channels that may dynamically be altered is preferably provided (step 200). Communication with the NE is monitored to determine whether removal of a selected channel from the group is required (step 210).

In a case where a selected channel is to be removed from the group of virtually concatenated channels, the selected channel is preferably removed (step 220) from the group and then if a network delay associated with the group of virtually concatenated channels excluding the removed channel is shorter than a network delay associated with the removed channel, at least one negative pointer justification action is preferably applied on the group of virtually concatenated channels excluding the removed channel (step 230) after removal of the selected channel. The at least one negative pointer justification action may include a plurality of consecutive negative pointer justification actions that are preferably applied until the network delay associated with the group of virtually concatenated channels excluding the removed channel is minimized. No pointer justification actions are necessary if the network delay associated with the group of virtually concatenated channels excluding the removed channel is longer than the network delay of the removed channel.

Figure 4:
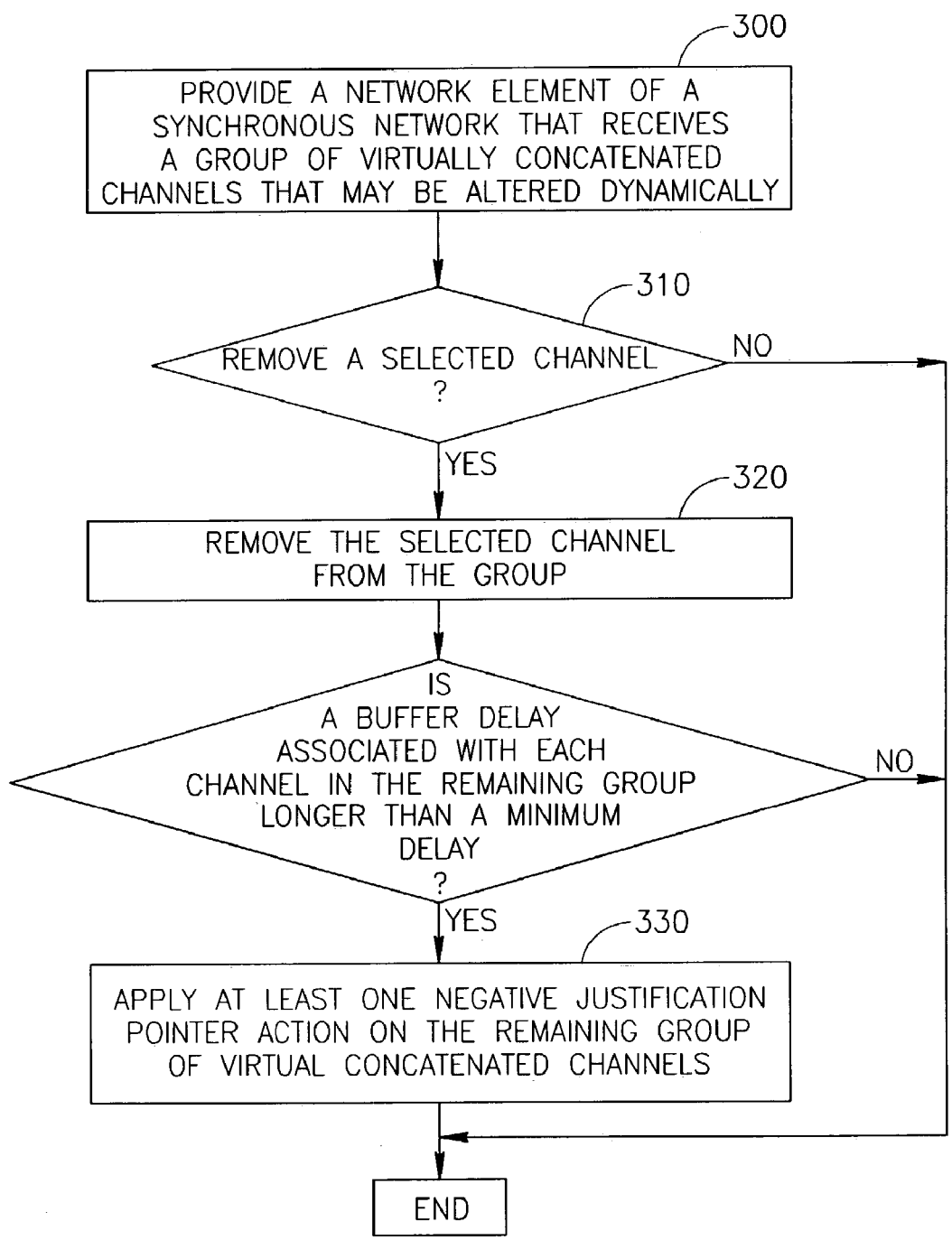
FIG. 4 is a simplified flowchart illustration of yet another preferred method of operation of the network of FIG. 1.

Reference is now made to FIG. 4 which is a simplified flowchart illustration of yet another preferred method of operation of the network 10 of FIG. 1.

A network element of a synchronous network that is operatively associated with a group of virtually concatenated channels that may dynamically be altered is preferably provided (step 300). Communication with the NE is monitored to determine whether removal of a selected channel from the group is required (step 310).

In a case where a selected channel is to be removed from the group of virtually concatenated channels, the selected channel is preferably removed (step 320) from the group. Then, if a buffer delay associated with each channel in the group excluding the removed channel is longer than a minimum delay, at least one negative pointer justification action is preferably applied on the group excluding the removed channel (step 330) after removal of the selected channel. The at least one negative pointer justification action may include a plurality of consecutive negative pointer justification actions that are preferably applied until the buffer delay associated with each channel in the group excluding the removed channel is minimized. No pointer justification actions are necessary if the buffer delay associated with at least one of the channels in the group excluding the removed channel equals the minimum necessitated delay.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited by what has been particularly shown and described herein above. Rather the scope of the invention is defined by the claims that follow:

What is claimed is:

1. A method for dynamically adding a new channel to and/or dynamically removing a selected channel from a group of virtually concatenated channels carrying traffic to a network element (NE) of a synchronous network:

for dynamically adding said new channel:
if a network delay associated with said new channel is longer than a network delay associated with said group of virtually concatenated channels:
delaying traffic received along the group of virtually concatenated channels until the group of virtually concatenated channels and the new channel are time-aligned, and
adding said new channel to the group of virtually concatenated channels following said time-alignment of the group of virtually concatenated channels and the new channel; and
if the network delay associated with the new channel is shorter than the network delay associated with said group of virtually concatenated channels:
delaying traffic in the new channel until the new channel and the group of virtually concatenated channels are time-aligned, and
adding said new channel to the group following said time-alignment of the new channel and the group of virtually concatenated channels,
for dynamically removing said selected channel:
removing the selected channel from said group of virtually concatenated channels; and
applying, after said step of removing, at least one negative pointer justification action on the group of virtually concatenated channels excluding the removed channel if a network delay associated with the group of virtually concatenated channels excluding the removed channel is shorter than a network delay associated with the removed channel.

2. The method according to claim 1 for dynamically adding said new channel and wherein any of the delaying steps comprises a step of applying at least one positive pointer justification action.

3. The method according to claim 1 for dynamically adding said new channel and wherein if the network delay associated with the new channel is shorter by a period TD2 than the network delay associated with the group of virtually concatenated channels, said step of delaying traffic in the new channel comprises one of the following:
a step of applying at least one direct delay action on said new channel for a period TD2; and
a step of delaying traffic in the new channel for NC2 consecutive positive pointer justification actions, each having a duration $TL2_j$, where j is an index running from 1 to NC2, and $$TD2 = \sum_{j=1}^{NC2} TL2_j.$$

4. The method according to claim 2 and wherein said step of applying at least one positive pointer justification action comprises applying a plurality of consecutive positive pointer justification actions until the new channel and the group of virtually concatenated channels are time-aligned.

5. The method according to claim 1 for dynamically adding said new channel and wherein if the network delay associated with the new channel is longer by a period TD1 than the network delay associated with the group of virtually concatenated channels, said step of delaying the traffic received along the group of virtually concatenated channels comprises a step of applying on the traffic received along the group of virtually concatenated channels NC1 consecutive positive pointer justification actions, each having a duration $TL1_i$, where i is an index running from 1 to NC1, and $$TD1 = \sum_{i=1}^{NC1} TL1_i.$$

6. The method according claim 1, and wherein said synchronous network comprises at least one of the following: a network based on the Synchronous Optical Network (SONET); and a network based on the Synchronous Digital Hierarchy (SDH).

7. The method according to claim 1 for dynamically removing said selected channel and wherein said step of applying at least one negative pointer justification action comprises applying a plurality of consecutive negative pointer justification actions until the network delay associated with the group of virtually concatenated channels excluding said removed channel is minimized.

8. The method according to claim 1 for dynamically removing said selected channel and wherein if the network delay associated with the removed channel is longer by a period TD than the network delay associated with the group of virtually concatenated channels excluding said removed channel, said applying step comprises applying at most NC consecutive negative pointer justification actions on the group of virtually concatenated channels excluding said removed channel, where each of said NC consecutive negative pointer justification action has a duration $TL_i$, i is an index running from 1 to NC, and $$TD = \sum_{i=1}^{NC1} TL_i.$$

9. A method for dynamically adding a new channel to a group of virtually concatenated channels carrying traffic to network element (NE) of a synchronous network, the method comprising the steps of:
pausing traffic received from a client;
adding said new channel to the group of virtually concatenated channels;
time-aligning the group of virtually concatenated channels and the new channel; and
resuming reception of traffic from the client and transmission of traffic along said group of virtually concatenated channels including the new channel,
and wherein if the network delay associated with the new channel is shorter than the network delay associated with said group of virtually concatenated channels, the time-aligning step is carried out by delaying the group by a period of time which is substantially equal to the difference between the network delay associated with the group and the delay associated with the channel to be added.

10. Apparatus for dynamically adding a new channel to a group of virtually concatenated channels carrying traffic, the apparatus comprising:
a controller; and
a synchronous processor operatively associated with said group of virtually concatenated channels and said new channel, and operative, under control of the controller, to perform the following:
delay traffic received along the group of virtually concatenated channels until time-aligning the group of virtually concatenated channels and the new channel and add said new channel to the group of virtually concatenated channels following said time-alignment of the group of virtually concatenated channels and the new channel if a network delay associated with said new channel is longer than a network delay associated with said group of virtually concatenated channels, and
delay traffic in the new channel until time-aligning the new channel and the group of virtually concatenated channels and add said new channel to the group following said time-alignment of the new channel and the group of virtually concatenated channels if the network delay associated with the new channel is shorter than the network delay associated with said group of virtually concatenated channels.

11. A network element (NE) comprising the apparatus of claim 10 and operative in a synchronous network which comprises at least one of the following: a network based at least partially on the Synchronous Optical Network (SONET); and a network based at least partially on the Synchronous Digital Hierarchy (SDH).

12. The apparatus according to claim 10 and wherein said synchronous processor is operative to delay the traffic received along the group of virtually concatenated channels by applying, under control of the controller, at least one positive pointer justification action.

13. The apparatus according to claim 10 and wherein said synchronous processor is operative to delay the traffic received along the group of virtually concatenated channels or the traffic in the new channel by applying, under control of the controller, a plurality of consecutive positive pointer justification actions until time-alignment of the group of virtually concatenated channels and the new channel.

14. The apparatus according to claim 10 and wherein if the network delay associated with the new channel is shorter by a period TD2 than the network delay associated with the group of virtually concatenated channels, said synchronous processor is operative to delay the traffic in the new channel by applying, under control of the controller, one of the following:
at least one direct delay action on said new channel for a period TD2; and
NC2 consecutive positive pointer justification actions, each having a duration $TL2_j$, where j is an index running from 1 to NC2, and $$TD2 = \sum_{j=1}^{NC2} TL2_j.$$

15. The apparatus according to claim 10 and wherein if the network delay associated with the new channel is longer by a period TD1 than the network delay associated with the group of virtually concatenated channels, said synchronous processor is operative to delay the traffic received along the group of virtually concatenated channels by applying on the traffic received along the group of virtually concatenated channels NC1 consecutive positive pointer justification actions, each having a duration $TL1_i$, where i is an index running from 1 to NC1, and $$TD1 = \sum_{i=1}^{NC1} TL1_i.$$

\* \* \* \* \*